(12) United States Patent
Radaeva (10) Patent No.: US 12,063,420 B2
(45) Date of Patent: Aug. 13, 2024

(54) SYSTEMS AND METHODS FOR PROVIDING IMAGE CONTENT ASSOCIATED WITH MUSIC CHANNELS

(71) Applicant: DISH Network L.L.C., Englewood, CO (US)

(72) Inventor: Nadezhda Radaeva, Highlands Ranch, CO (US)

(73) Assignee: DISH Network L.L.C., Englewood, CO (US)

(*) Notice: Subject to any disclaimer, the term of this patent is extended or adjusted under 35 U.S.C. 154(b) by 20 days.

(21) Appl. No.: 17/453,582

(22) Filed: Nov. 4, 2021

(65) Prior Publication Data

US 2023/0134232 A1 May 4, 2023

(51) Int. Cl.
*H04N 21/472* (2011.01)
*H04N 21/439* (2011.01)
*H04N 21/44* (2011.01)
*H04N 21/45* (2011.01)
*H04N 21/4722* (2011.01)

(52) U.S. Cl.
CPC ..... *H04N 21/4722* (2013.01); *H04N 21/4394* (2013.01); *H04N 21/44008* (2013.01); *H04N 21/4532* (2013.01)

(58) Field of Classification Search
None
See application file for complete search history.

(56) References Cited

U.S. PATENT DOCUMENTS

| | | | |
|---|---|---|---|
| 2003/0023975 A1* | 1/2003 | Schrader | H04N 21/2665 725/51 |
| 2007/0044137 A1* | 2/2007 | Bennett | H04N 7/17318 348/E7.071 |
| 2010/0053149 A1* | 3/2010 | Inoue | H04N 21/4316 345/418 |
| 2015/0319506 A1* | 11/2015 | Kansara | H04N 21/43079 725/32 |
| 2021/0373843 A1* | 12/2021 | Hornsby | H04N 21/4884 |

* cited by examiner

*Primary Examiner* — Jefferey F Harold
*Assistant Examiner* — Charles N Hicks
(74) *Attorney, Agent, or Firm* — KW Law, LLP (57) ABSTRACT

A method for providing image content associated with music channels includes the steps of: receiving, from a user, a selection of a music television channel; providing, to the user, the music television channel associated with the user's selection, wherein the music television channel comprises a signal comprising audio information and metadata associated with the audio information; retrieving, based on the metadata associated with the audio information, visual content relevant to the audio information; and simultaneous providing to the user both the visual content and the audio information.

19 Claims, 5 Drawing Sheets

SYSTEMS AND METHODS FOR PROVIDING IMAGE CONTENT ASSOCIATED WITH MUSIC CHANNELS

TECHNICAL FIELD

The following disclosure relates generally to systems and methods associated with electronic media, particularly audio and visual media content. More particularly, the present disclosure relates to systems and methods for providing image content associated with music channels.

BACKGROUND

Cable, satellite, and broadcast television systems provide viewers with a large number of television channels. Many such systems also provide digital and analog music channels to their customers. Music program listings and other music application data (e.g., track, title, artist information, etc.) are typically provided by a satellite uplink facility to a number of broadcast system head-ends. Each head-end distributes the music application data for each music channel to a number of users as part of a data stream.

Interactive program guides have been developed that provide users with the ability to view music channel information that is sent ahead of the music programming carried on the channels. Such music channel information has included the type of music carried by each channel (e.g., rock, disco, etc.) and the channel's number and call letters, song titles, and other song specific information. The program guide typically obtains program guide data when the viewer is not watching television. The program guide may also obtain program guide data when the user is watching one of the channels that carry an in-band data stream.

While this program guide information is generally available, there is typically no further associated content provided along with the music programming carried on the channels. As far as additional video content, typically only a generic background image is provided, perhaps listing simply the information on the screen derived from the program guide information, such as channel name, music genre, artist name, song name, etc. As such, it is postulated that, when a user tunes to a music channel, the user may lack sufficient engagement with the channel to continue to stay tuned to the channel for any length of time. This may be particularly true in social settings, where those gathered around the television may be interested in both audio and visual content, that it, more engaging visual content than simply the aforementioned generic background image.

It may be further postulated that, in these situations and others, the lack of engagement by the user may lead the user to discontinue watching such music channels, and instead seek similar content elsewhere. For example, a plurality of other media, particularly streaming media such as YouTube and the like, offer video content associated with audio content. In the context of music, this could include the artist's official music video for the particular song, a concert recording, and the like. For the providers of television music channels, this may be a less than desirable scenario, as the provider loses engagement with the user, and possible also loses the opportunity for placing advertisements on the screen, or other revenue generating possibilities.

There thus exists an ongoing demand for improvements in a user's television music channel experience. It would be desirable for relevant, associated video content to be displayed along with the music being playing such that the user may remain more engaged with the channel. Moreover, it would be desirable to provide systems and methods to discern and obtain such visual content in a real-time manner. It would further be desirable to the user to be able to configure such visual content in a manner that would be most engaging and most relevant to the user, depending on user preferences. Other desirable features and characteristics of embodiments of the present invention will become apparent from the subsequent Detailed Description and the appended Claims, taken in conjunction with the accompanying drawings and the foregoing Background.

BRIEF SUMMARY

In accordance with one exemplary embodiment, a method for providing image content associated with music channels includes the steps of: receiving, from a user, a selection of a music television channel; providing, to the user, the music television channel associated with the user's selection, wherein the music television channel comprises a signal comprising audio information and metadata associated with the audio information; retrieving, based on the metadata associated with the audio information, visual content relevant to the audio information; and simultaneous providing to the user both the visual content and the audio information.

In accordance with another exemplary embodiment, a system for providing image content associated with music channels includes: a set-top box, associated with a display device, configured to receive, from a user, a selection of a music television channel; a head-end system of a media content provider communicatively coupled with the set-top box configured to provide, to the user, the music television channel associated with the user's selection, wherein the music television channel comprises a signal comprising audio information and metadata associated with the audio information; the set-top box being further configured to retrieving, based on the metadata associated with the audio information, visual content relevant to the audio information; and the set-top box being further configured to simultaneously providing to the user both the visual content and the audio information.

This brief summary is provided to introduce a selection of concepts in a simplified form that are further described below in the detailed description. This brief summary is not intended to identify key features or essential features of the claimed subject matter, nor is it intended to be used as an aid in determining the scope of the claimed subject matter.

BRIEF DESCRIPTION OF THE DRAWING

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Embodiments of the present disclosure are generally directed to systems and methods for providing image content associated with music channels. Utilizing metadata from the electronic programming guide associated with the music channel, relevant, associated visual information may be obtained from a variety of sources, and displayed on-screen to the user while the music simultaneously provided as the audio feed. Such sources include, but are not limited to, stored databases, network-obtained information (such as via the Internet), user-specified content, among others. Moreover, in accordance with the systems and methods described herein, the user may configure the visual content provided to correspond with the user's preferences, such as types of visual content, sources of visual content, display configuration and size, and the like. In this manner, the user is provided with a more engaging experience when tuned to a music channel.

Network Environment

As initially noted, each of cable, satellite, and broadcast television systems provide viewers with a large number of television music channels from which to select. The manner in which these channels are provided to the user depends on the type of system being considered. For purposes of exemplary illustration, the network environment of a satellite television system will be provided herein.

Figure 1:
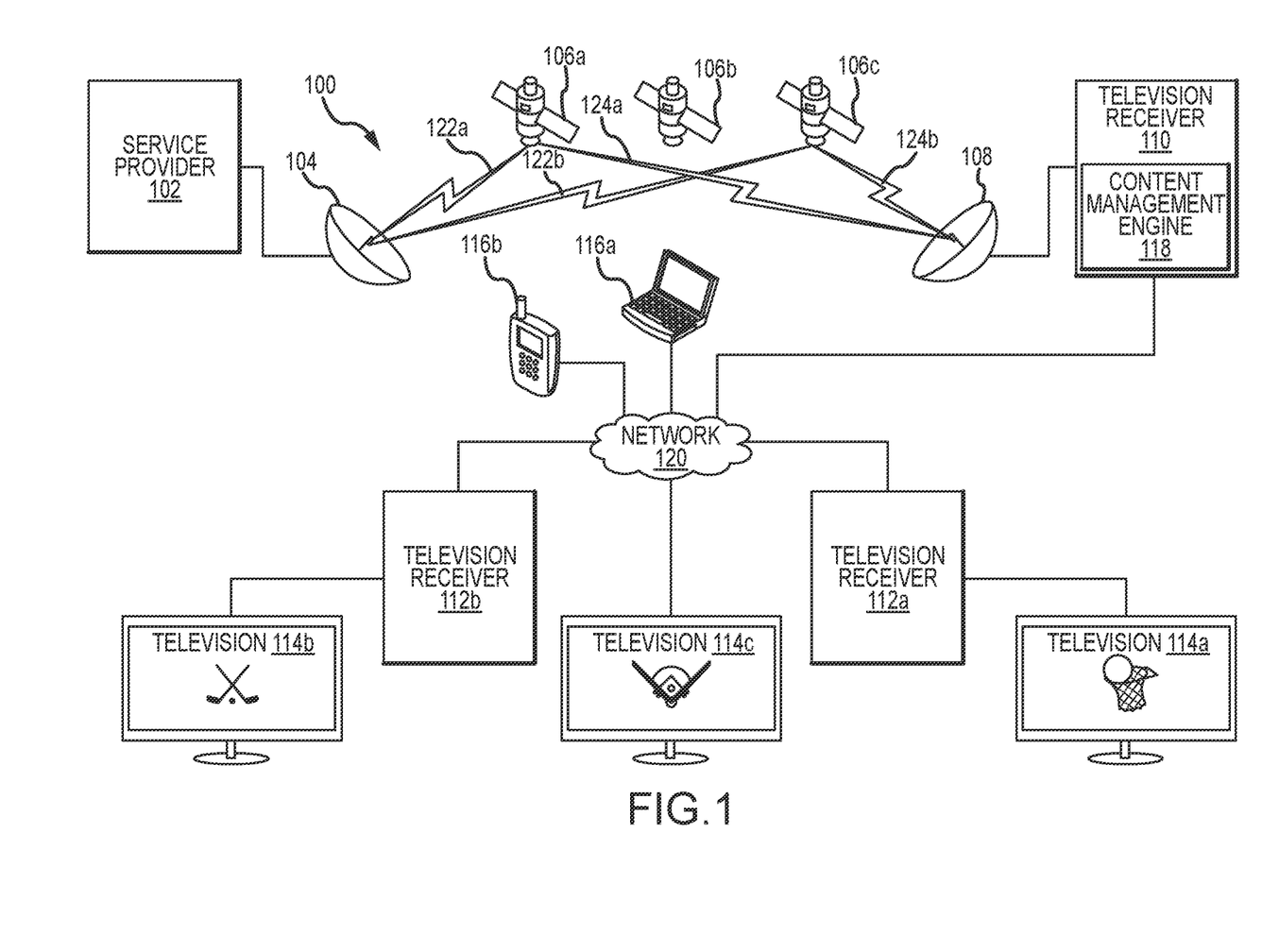
FIG. 1 shows an embodiment of a media content distribution system in which aspects of the present disclosure may be implemented.

Referring now to FIG. 1, an embodiment of a media content distribution system 100 is shown in which aspects of the present disclosure may be implemented. For brevity, the system 100 is depicted in a simplified and conceptual form, and may generally include more or fewer systems, devices, networks, and/or other components as desired. Further, the number and type of features or elements incorporated within the system 100 may or may not be implementation-specific, and at least some of the aspects of the system 100 may be similar to a cable television distribution system, an IPTV (Internet Protocol Television) content distribution system, and/or any other type of media or content distribution system.

The exemplary system 100 may include a service provider 102, a satellite uplink 104, a plurality of orbiting (e.g., geosynchronous) satellites 106a-c, a satellite dish 108, a PTR (Primary Television Receiver) 110, a plurality of secondary television receivers 112a-b, a plurality of televisions 114a-c, and a plurality of computing devices 116a-b. In the present example, the PTR 110 may at least include a content management engine 118.

The system 100 may also include at least one network 120 that establishes a bi-directional communication path for data transfer between and among the PTR 110, secondary television receivers 112a-b, televisions 11 a-c, and computing devices 116a-b of the system 100. In some embodiments, the network 120 may further establish a bi-directional communication path (not shown) for data transfer between the PTR 110 and the service provider 102. The network 120 is intended to represent any number of terrestrial and/or non-terrestrial network features or elements. For example, the network 120 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, and/or any other type of communication network(s) configured such that data may be transferred between and among respective elements of the example system 100.

The PTR 110, and the secondary television receivers 112a-b, may generally be any type of television receiver, such as a STB (Set Top Box) for example. In another example, the PTR 110, and the secondary television receivers 112a-b, may exhibit functionality integrated as part of or into a television, a computing device, such as a tablet computing device, or any other computing system or device, as well as variations thereof. Further, the PTR 110 and the network 120, together with the secondary television receivers 112a-b, televisions 114a-c, and computing devices 116a-b, may form at least a portion of a particular home computing network, and may each be respectively configured such as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-Bandwidth Digital Content Protection), etc.

In practice, the satellites 106a-c may be configured to receive uplink signals 122a-b from the satellite uplink 104. In this example, the uplink signals 122a-b may contain one or more transponder streams of particular data or content, such as particular music television channel, that is supplied by the service provider 102. In this example, different media content may be carried using different ones of the satellites 106a-c. Further, different media content may be carried using different transponders of a particular satellite (e.g., satellite 106a); thus, such media content may be transmitted at different frequencies and/or different frequency ranges. For example, a first and second music television channel may be carried on a first carrier frequency over a first transponder of satellite 106a, and a third, fourth, and fifth music television channel may be carried on second carrier frequency over a first transponder of satellite 106b, or, the third, fourth, and fifth music television channel may be carried on a second carrier frequency over a second transponder of satellite 106a, etc.

The satellites 106a-c may further be configured to relay the uplink signals 122a-b to the satellite dish 108 as downlink signals 124a-b. Similar to the uplink signals 122a-b, each of the downlink signals 124a-b may contain one or more transponder streams of particular data or content, such as various encoded and/or at least partially electronically scrambled music television channels, etc., in accordance with an allotted carrier frequency and bandwidth. The downlink signals 124*a-b*, however, may not necessarily contain the same or similar content as a corresponding one of the uplink signals 122*a-b*. For example, the uplink signal 122*a* may include a first transponder stream containing at least a first group or grouping of television music channels, and the downlink signal 124 *a* may include a second transponder stream containing at least a second, different group or grouping of television music channels. In other examples, the first and second group of television music channels may have one or more television music channels in common. In sum, there may be varying degrees of correlation between the uplink signals 122*a-b* and the downlink signals 124*a-b*, both in terms of content and underlying characteristics.

Continuing with the example implementation scenario shown in FIG. 1, the satellite dish 108 may be provided for use to receive television music channels, such as on a subscription basis, provided by the service provider 102, satellite uplink 104, and/or satellites 106*a-c*. For example, the satellite dish 108 may be configured to receive particular transponder streams, or downlink signals 124*a-b*, from one or more of the satellites 106*a-c*. Based on the characteristics of the PTR 110 and/or satellite dish 108, however, it may only be possible to capture transponder streams from a limited number of transponders concurrently. For example, a tuner of the PTR 110 may only be able to tune to a single transponder stream from a transponder of a single satellite, such as satellite 106*a*, at a time.

Additionally, the PTR 110, which is communicatively coupled to the satellite dish 108, may subsequently select via tuner, decode, and relay particular transponder streams to the television 114*c* for display thereon. For example, the satellite dish 108 and the PTR 110 may, respectively, be configured to receive, decode, and relay at least one television music channel to the television 114*c*. In this example, the channel may be output to the television 114*c* in accordance with the HDMI/HDCP content protection technologies. Other embodiments are possible.

Electronic Programming Guide Metadata

Figure 2:
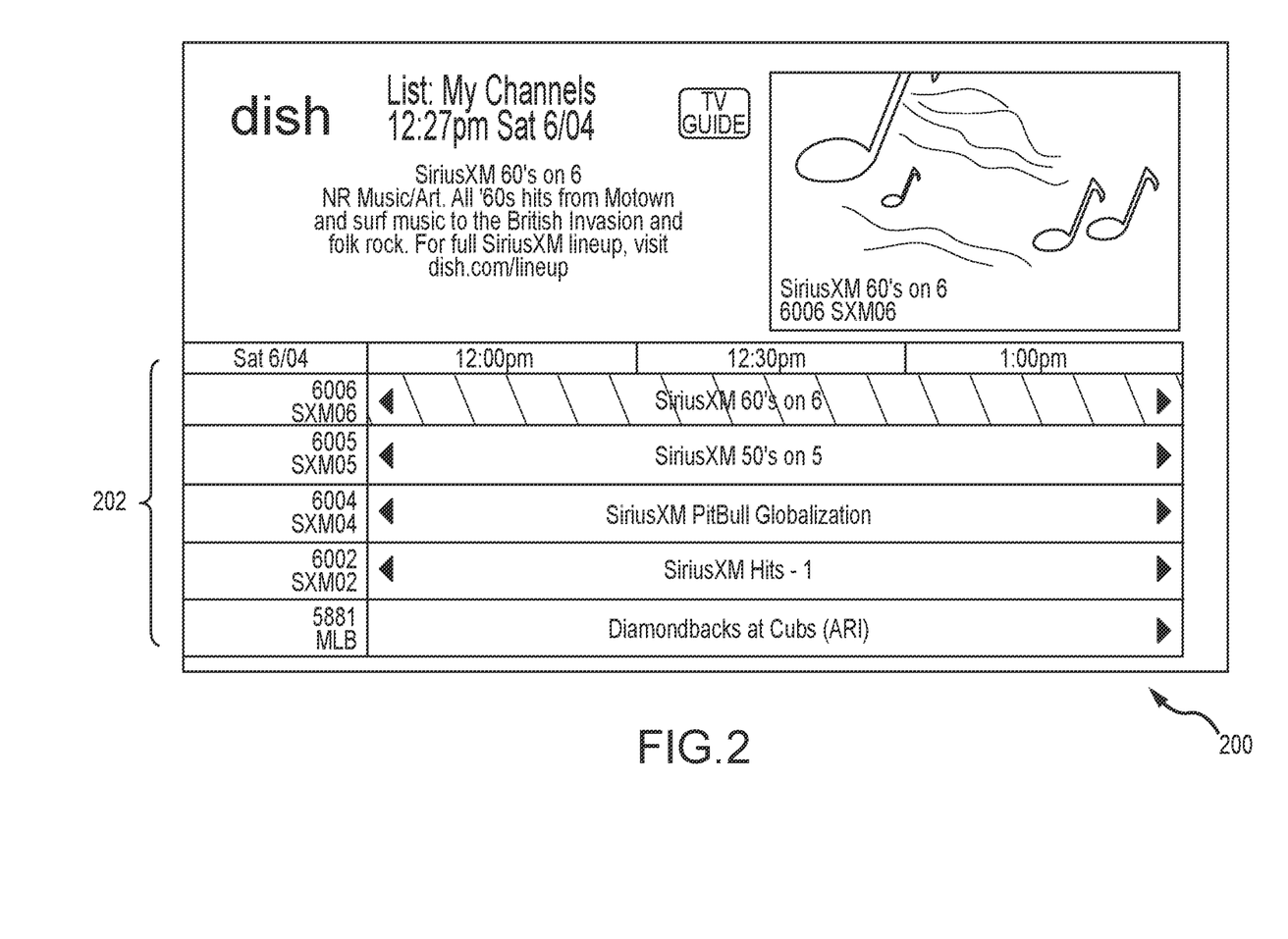
FIG. 2 shows an embodiment of an electronic programming guide for music television channels displaying metadata associated with the music played on such channels.

As initially noted, Interactive electronic programming guides (EPG) have been developed that provide users with the ability to view music channel information that is sent ahead of the music programming carried on the channels. Such music channel information has included the type of music carried by each channel (e.g., rock, disco, etc.) and the channel's number and call letters, song titles, and other song specific information. Referring now to FIG. 2, illustrated is an exemplary electronic programming guide 200 displaying television music channel information to the user, which is sent along with the audio signal as metadata and displayed to the user through the guide. For example, in FIG. 2, illustrated in area 202 are five music channels, which display the genre of the music that is typically played on such channels.

Other metadata may also be provided in some embodiments, which may or may not be displayed to the user on-screen. For example, audio data typically includes metadata that is used to describe the various songs being played on the particular music channel Example metadata for each song could include identifying information describing the song, timing information that directs the receiver to songs at the appropriate times, song attributes, and/or any other information as appropriate. The example illustrated in FIG. 2 is intended to show various types of information that may be maintained within metadata; equivalent embodiments could use alternate information, additional information, and/ or information formatted in any other manner as desired.

In various embodiments, metadata includes information such as a genre indictor that identifies a song type (e.g., "rock", "pop", "jazz", "Spanish", "Korean", etc.). In some implementations, a viewer may prefer one genre of music over another; a genre indication can be very helpful in selecting songs of that type. Other embodiments may additionally or alternately provide other information about the song, such as the song tempo, volume, dynamic range, mood, date or time period (e.g., "seventies", "eighties", "pre-War", "current", etc.). In various embodiments, receiving device can use this information to identify other songs having similar characteristics from a viewer's viewing history, from a network service, and/or from any other source. Various embodiments could additionally identify songs using any sort of song-identifying information in metadata, such as a song title, artist, album name and/or the like. This identifying information could be used to facilitate additional features for the viewer, including obtaining and displayed relevant, associated visual content, as will be discussed in greater detail below.

Visual Content—Database

Using the aforementioned electronic programming guide metadata, embodiments of the present disclosure may obtain relevant, associated visual content to the user while the user is watching the particular music channel, from one or more databases. These databases may be stored locally at the user's set-top-box, but more often they will be stored at the head-end of the network service and transmitted to the user's set-top-box along with the audio content (music). For example, a database may be generated with images associated to a specific music played or a specific channel A user tuning to any such music channel will have an option to watch customized images "as a clip" specifically assorted to match certain music played. As possible examples among many, when a user is listening to a summer music mix, there might be constantly changing images with the beach and/or ocean; or, when a user is listening to pop music, there might be displayed images with models, dance clubs, and fashion, etc.

Figure 3:
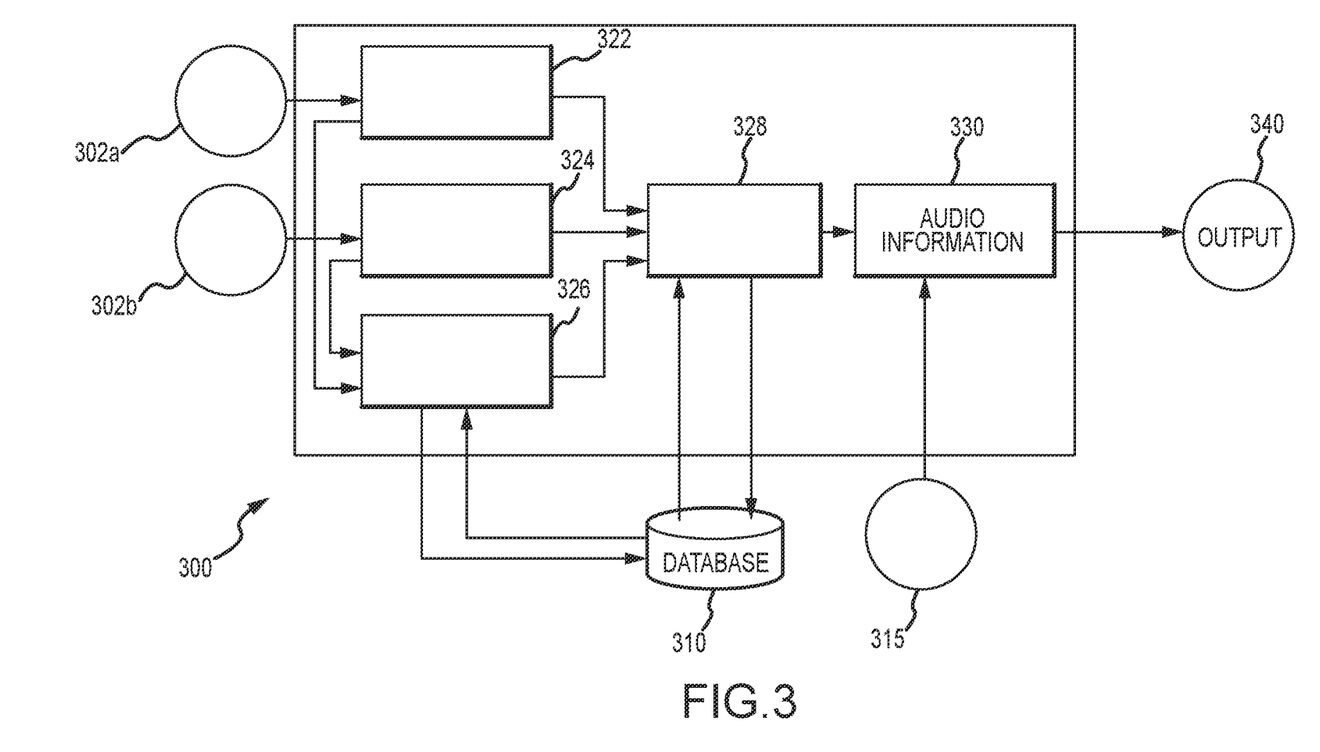
FIG. 3 shows an embodiment of a database system for retrieving images associated with the metadata described in connection with FIG. 2

Turning now to FIG. 3, and exemplary image database system 300. Database system 300 is communicatively coupled with the user's set-top box, and may be located or associated with the head-end system of the media content provider. Database system 300 receives as it's input(s) 302*a*, 302*b* one or more sources of metadata as described above. The metadata may be processed at processing blocks 322, 324, and thereafter provided to a search block 326. Search block 326 determines appropriate image content based on the metadata received. Search block 326, as illustrated, is coupled with image database 310, and sends instructions as to which images to retrieve. Thereafter, database 310 provides the images to processing block 328, which, in turn combines the images with the audio information (music) 330, which has been received from audio information source 315. The combined signal, audio and visual, is then provided as output 340 to the user's set-top box.

Visual Content—Network

In an alternative embodiment, the systems and methods of the present disclosure may obtain relevant, associated image content from network sources. A common example of this is the Internet, utilizing one or more of the numerous websites that host image content, and are searchable. In this context, the user's set-top box, as indicated in FIG. 1, may be operatively coupled with a network such as the internet to search and retrieve the image content, based on the metadata as described above. For example, when a user selects a particular music channel, the set-top box may provide the metadata to a search functionality, coupled with the network, which then uses the metadata to search for and retrieve relevant, associated image content.

Figure 4:
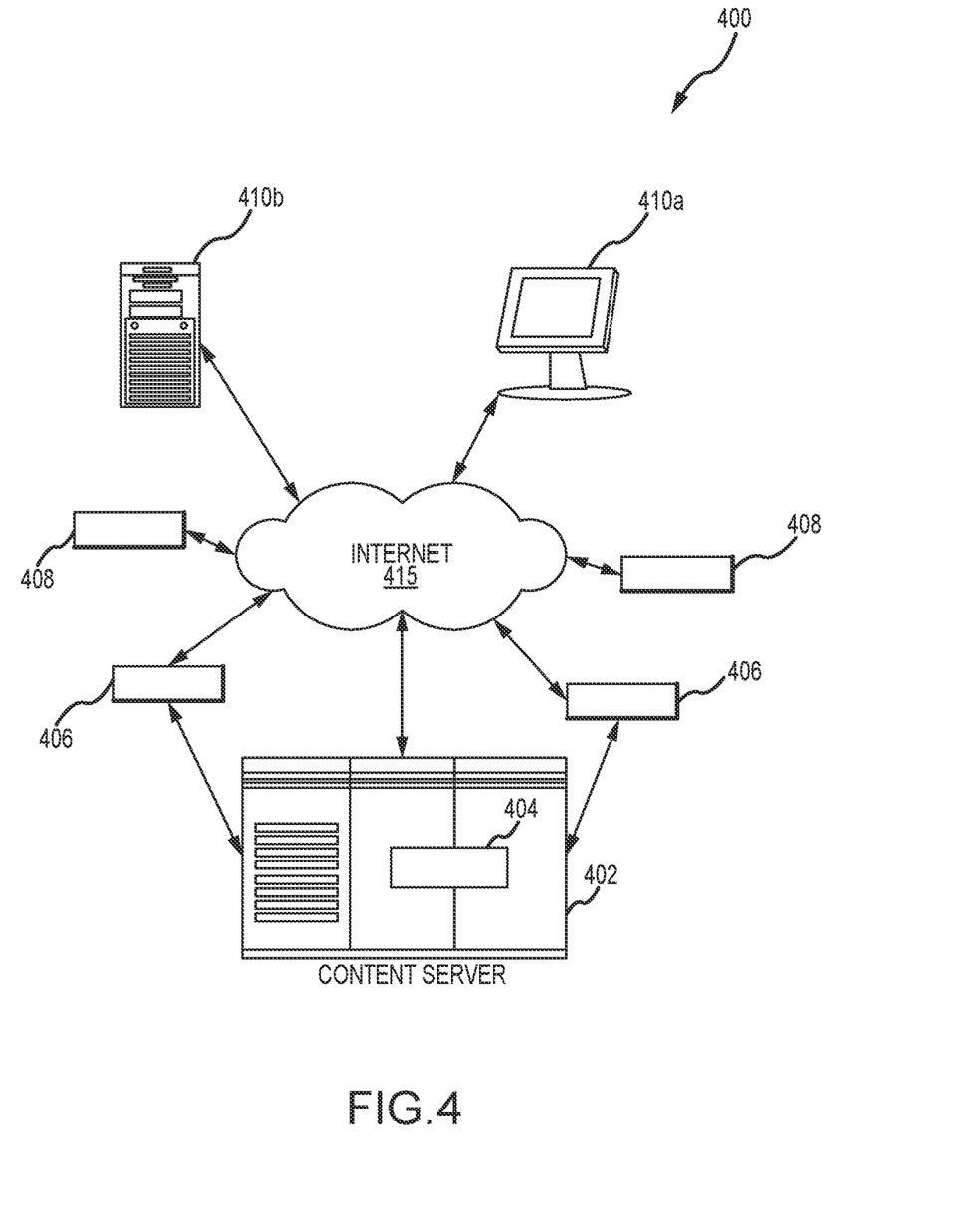
FIG. 4 shows an embodiment of a network system for retrieving images associated with the metadata described in connection with FIG. 2.

Referring now to FIG. 4, which depicts a system 400 for network search and retrieval of image content, a user may select a particular music channel using one or more user devices 410a, 410b. These devices are connected with a network, in this example the Internet 415. The Internet 415 is connected to a plurality of hosted servers 408, proxy servers 406, and content servers 402, which contains image content 404. The metadata is transferred from the user devices 410a, 410b, via the Internet 415, to one or more of these servers. In response, the one or more servers returns the selected image content, via the Internet 415, to the one or more user devices 410a, 410, where, the user device, for example through a set-top box or other means, displays the retrieved image content while the music with the associated metadata is playing.

With regard to either the database embodiment or the network embodiment, it should be appreciated that the user may be able to configure the type of image content receive and displayed. For example, in accordance with the systems and methods described herein, the user may configure the visual content provided to correspond with the user's preferences, such as types of visual content, sources of visual content, display configuration and size, and the like. This configuration may be performed using a "settings" menu, for example, on the user's device, such as the set-top box. When such configurations are made by the user, this information will be sent along with the metadata to the database or through the network to select only image content that accords with the user's preferences. In a further variation, there may be automatic setting preference that the user does not need to individually make, such as a setting that blocks objectionable content from being retrieved and displayed. This setting may not be relevant in the context of the database because those images can be controlled by the host of the database, but may be particularly relevant in the context of image content received via a network, such as the Internet, where less control is possible.

Method

Figure 5:
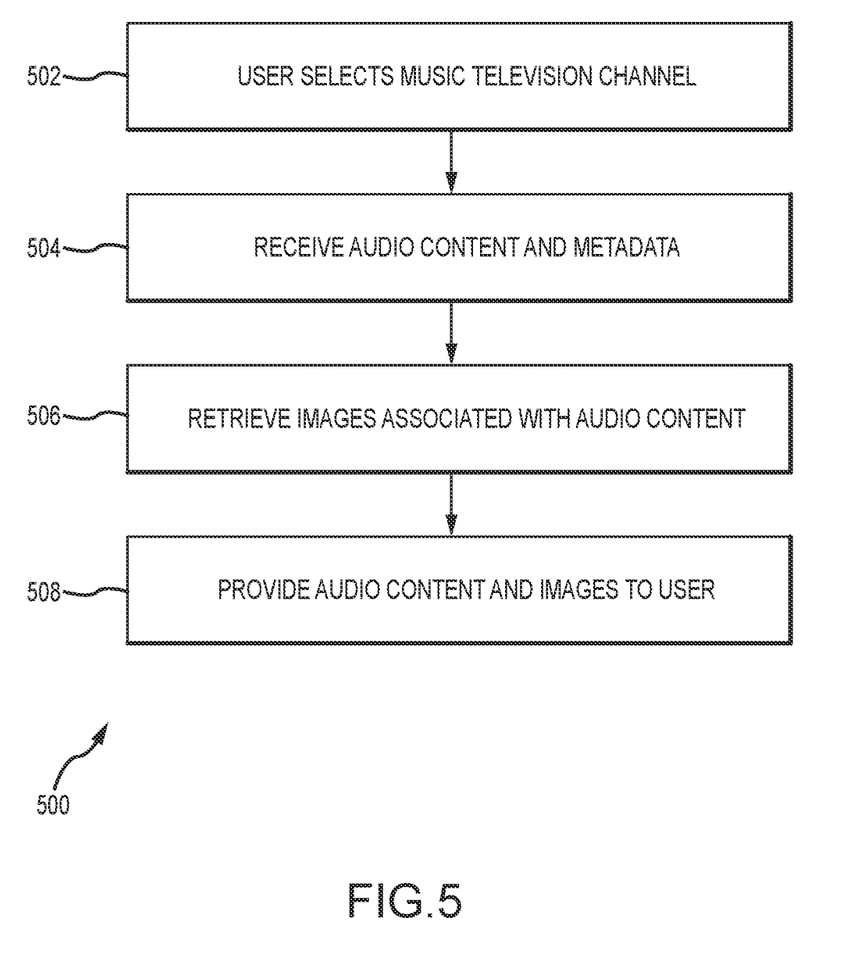
FIG. 5 is a method flow diagram illustrating a method for providing image content associated with music channels in accordance with exemplary embodiments of the present disclosure.

In accordance with the foregoing, a method 500 for providing image content associated with music channels, as illustrated in FIG. 5, includes a first step 502 wherein the user selects a particular music television channel. The user may make this selection while watching television, for example, and using a controlling device associated with the set-top box. Thereafter, at step 504, based on the user's selection, the appropriate music television channel is tuned, and music and metadata associated with the music is received and displayed to the user, for example as illustrated in FIG. 2. Some or all of the metadata may be displayed. Thereafter, at step 506, utilizing either the database of FIG. 3 or the network of FIG. 4, the metadata is sent out to either (or both), and visual image content is retrieved and associated at the set-top box with the music content. Finally, at step 508, the combined audio and visual content are provided from the set-top box to the display device, such as the television, for the user.

Accordingly, the present disclosure has provided systems and methods for providing image content associated with music channels. The systems and method provide relevant, associated video content to be displayed along with the music being playing such that the user may remain more engaged with the channel. Further, the systems and methods discern and obtain such visual content in a real-time manner Still further, the systems and methods allow the user to be able to configure such visual content in a manner that would be most engaging and most relevant to the user, depending on user preferences.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

What is claimed is:

1. A method for providing image content associated with music channels, the method comprising the steps of:
    transmitting, from a set-top box associated with a user, a selection of a music television channel selected by the user;
    receiving, by the set top box, the music television channel in response to the selection, wherein the music television channel comprises audio information and metadata associated with the audio information, wherein the music television channel lacks video corresponding with the audio information, wherein the metadata comprises an artist name, a song title, a genre, or an album name;
    forwarding, by the set top box, at least some of the metadata to a visual content database to thereby obtain visual content relevant to the audio information from the visual content database using the artist name, song title, genre, or album name associated with the audio information;
    combining, by the set top box, the audio information with the visual content to generate a combined signal; and
    outputting simultaneously, by the set-top box, the visual content and the audio information from the combined signal.

2. The method of claim 1, wherein the selection is received at the set-top box associated with a display device, and wherein the set-top box is communicatively coupled with a head-end system of a media content provider.

3. The method of claim 2, wherein the music television channel is transmitted from the head-end system to the set-top box, and from the set-top box to the associated display device.

4. The method of claim 1, further comprising outputting a piece of the metadata with the visual content and the audio information.

5. The method of claim 2, wherein the step of forwarding is performed by sending the metadata to the visual content database associated with the head-end system.

6. The method of claim 1, further comprising the set top box sending the metadata via a network to one or more querying a database using the metadata to identify the visual content relevant to the audio information.

7. The method of claim 1, further comprising receiving, from the set-top box associated with the user, one or more user preferences regarding a preferred type of visual content.

8. A system for providing image content associated with music channels, the system comprising:

a set-top box, associated with a display device and configured to receive a selection of a music television channel; and a head-end system of a media content provider communicatively coupled with the set-top box and configured to transmit the music television channel in response to the selection, wherein the music television channel comprises a signal including audio information and metadata associated with the audio information, wherein the music television channel transmitted to the set-top box lacks video corresponding with the audio information, wherein the set-top box is configured to separately request and receive visual content relevant to the audio information from the head-end system based upon the received metadata that is associated with the audio information, wherein the set-top box is configured to combine the audio information with the separately-received visual content to generate a combined signal, and wherein the set-top box is configured to provide the combined signal to thereby simultaneously output both the visual content and the audio information via the display device.

9. The system of claim 8, wherein the set-top box is further configured to query a database with the metadata to identify the visual content relevant to the audio information.

10. The system of claim 9 wherein the database is stored by the set-top box.

11. The system of claim 8, wherein the set-top box is configured to retrieve the visual content by sending the metadata to a visual content database associated with the head-end system.

12. The system of claim 8, wherein the set-top box is configured to retrieve the visual content by sending the metadata via a network to one or more visual content servers.

13. The system of claim 8 wherein the set-top box is further configured to receive one or more user preferences identifying a preferred type of visual content.

14. An automated process to be performed by a set-top box, the automated process comprising:
receiving, by the set-top box, a selection of a music television channel from a user of the set-top box;
obtaining, by the set-top box in response to the selection, the music television channel, wherein the music television channel comprises a signal including audio information and metadata associated with the audio information;
separately requesting and retrieving, by the set-top box, visual content relevant to the audio information from a visual content database using the metadata associated with the audio information;
combining, by the set-top box, the audio information with the visual content to generate a combined signal for the music television channel; and
providing the combined signal to thereby simultaneously present the visual content and the audio information to the user of the set-top box.

15. The automated process of claim 14, wherein the set-top box is associated with a display device, and wherein the combined signal is provided to the display device for presentation to the user.

16. The automated process of claim 14, wherein the set-top box is further configured to query a database with the metadata to identify the visual content relevant to the audio information.

17. The automated process of claim 16 wherein the database is stored by the set-top box.

18. The automated process of claim 16 wherein the database is available to the set-top box via a network.

19. The automated process of claim 16 wherein the metadata comprises at least one of an artist name, a song title, a genre, and an album name that describes the audio information.

* * * * *